April 16, 1957  M. D. MARTIN ET AL  2,789,222
FREQUENCY MODULATION SYSTEM
Filed July 21, 1954  2 Sheets-Sheet 2

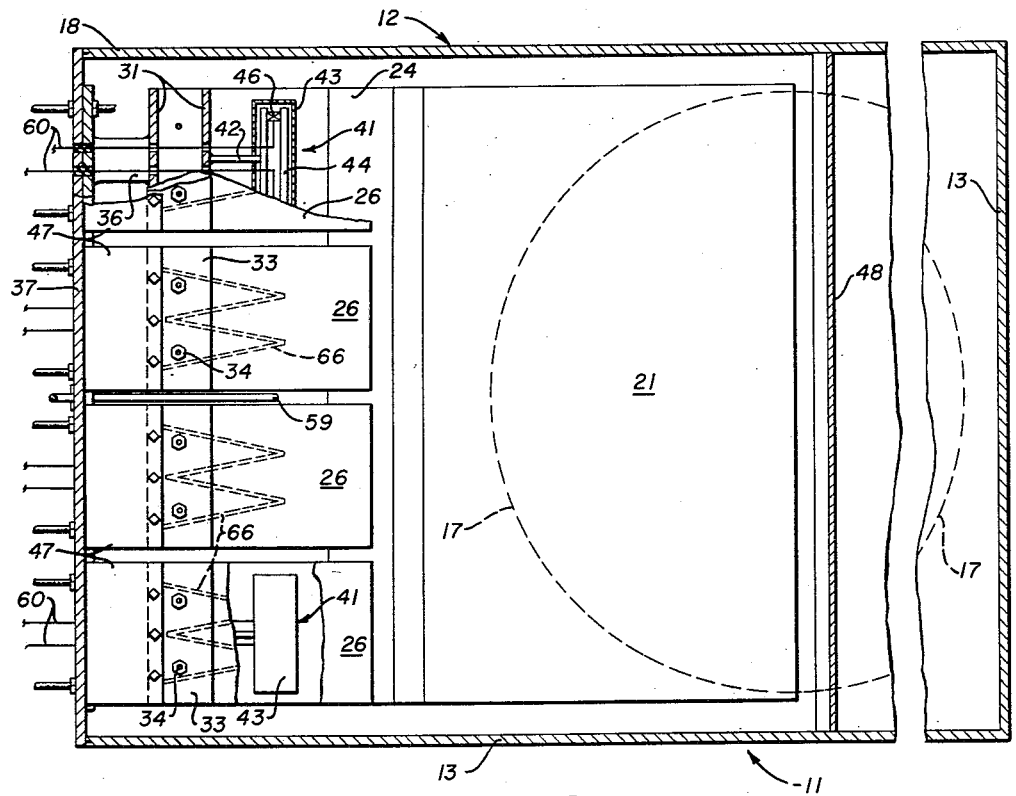
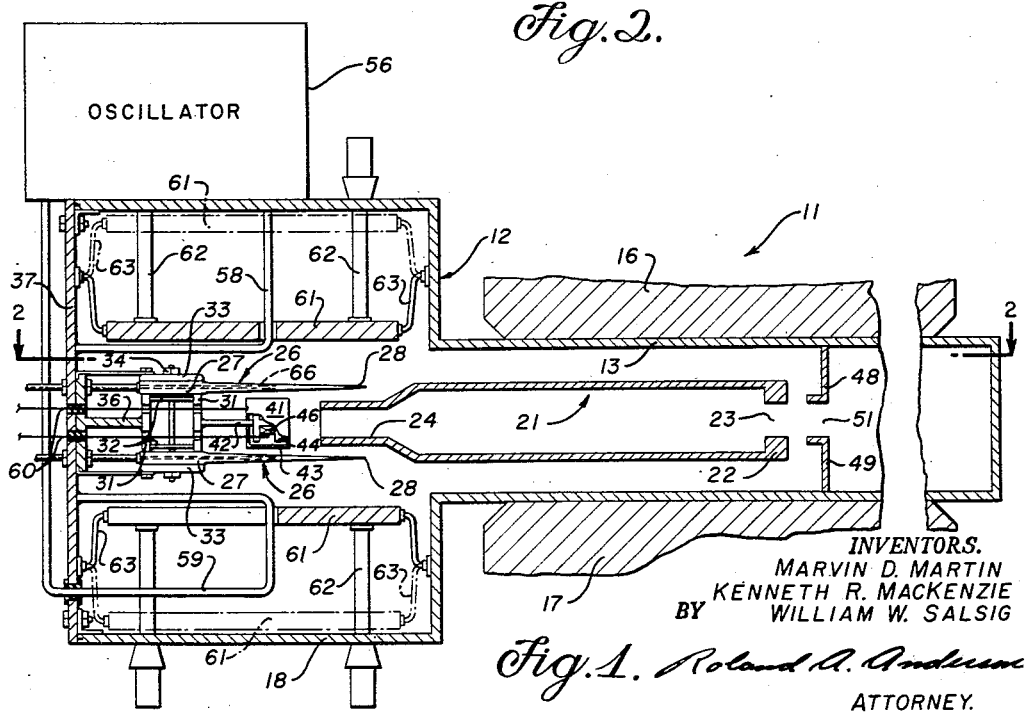

INVENTORS.
MARVIN D. MARTIN
KENNETH R. MACKENZIE
WILLIAM W. SALSIG
BY
Roland A. Anderson
ATTORNEY.

United States Patent Office 2,789,222
Patented Apr. 16, 1957

2,789,222

FREQUENCY MODULATION SYSTEM

Marvin D. Martin, Berkeley, Kenneth R. MacKenzie, Pacific Palisades, and William Winton Salsig, Berkeley, Calif., assignors to the United States of America as represented by the United States Atomic Energy Commission Application July 21, 1954, Serial No. 444,928

7 Claims. (Cl. 250—27)

The present invention relates to apparatus for varying the frequency of a high power electrical signal in a periodic manner and, more particularly, to a radio-frequency transmission line system including a vibrating blade capacitor for achieving frequency modulation.

Operating experience has shown that rotary capacitors, as utilized in a transmission line for a cyclotron, require considerable maintenance because of mechanical and electrical difficulties. One such radio-frequency system including a rotary capacitor is described in U. S. Patent 2,615,129, entitled "Synchrocyclotron," issued to E. M. McMillan on October 21, 1952, and another is decribed in U. S. Patent 2,545,623, entitled "Frequency Modulation System," issued to K. R. MacKenzie on March 20, 1951. In addition to the above-mentioned required maintenance, it will be apparent that as the upper limit of the frequency modulation range increases the value of required series capacitance increases, which fact requires a larger rotary capacitor. Increasing the size of the rotary capacitor adds to the cost of the system, increases the likelihood of mechanical and electrical breakdowns, and also increases the tendency of unwanted modes of oscillation to build up in the system.

To overcome the foregoing difficulties and disadvantages the present invention comprises, in general, a radio-frequency transmission line system having a vibrating blade capacitor connected between two sections thereof. With such transmission line system suitably excited, the series capacitance is altered cyclically by the vibrating capacitor to vary the resonant frequency of the system in a similar manner and thus provides the desired frequency modulation. A vibrating blade capacitor is simpler in construction, less costly, and requires less maintenance than a rotary capacitor for accomplishing equivalent results.

It is therefore an object of the present invention to provide a new and improved vibrating blade capacitor.

Another object of the invention is to provide a new and improved radio-frequency system for providing frequency modulated voltages.

Still another object of the invention is to provide a radio-frequency transmission line system having a vibrating blade capacitor for providing frequency modulation over a wide range of frequencies.

A further object of the invention is to provide a simple and easily adjustable variable capacitor for a radio-frequency system.

Other objects and advantages of the present invention will be apparent in the following description and claims considered together with the accompanying drawing, in which:

Figure 1 is a partial cross-sectional view of the invention;

Figure 2 is a sectional plan view of the invention of Fig. 1, taken along the line 2—2.

Figure 3:
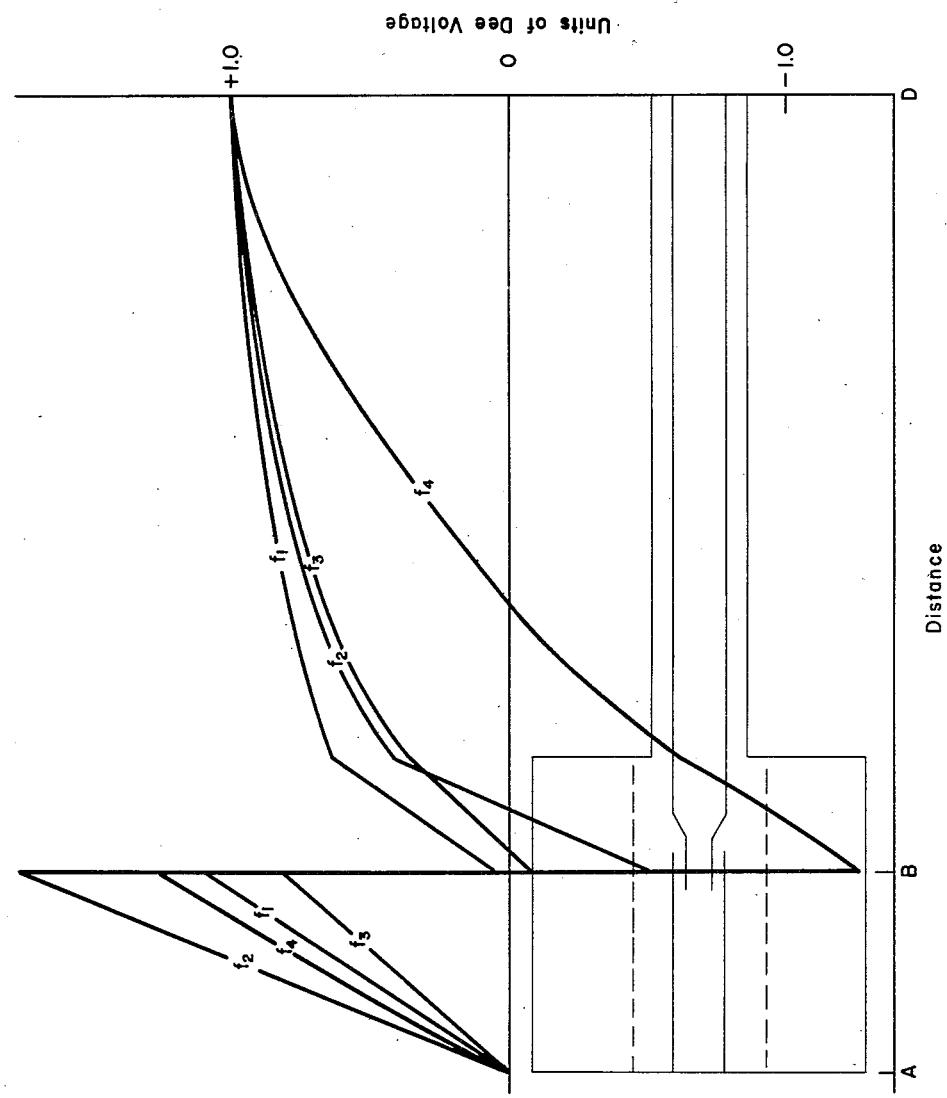
Figure 3 is a voltage distribution diagram.

Referring to the drawing in detail, Figs. 1 and 2 in particular, there is illustrated a portion of a frequency modulated cyclotron 11. Since such a cyclotron 11 is well known in the art and described in detail in the above-referenced U. S. Patent 2,615,129, only those elements directly related to the illustrated embodiment of the invention will be described herein. A tank 12 having a first portion 13 adapted to be disposed between opposing pole pieces 16 and 17 of a suitably excited electromagnet (not shown) and an enlarged second portion 18 disposed externally of the gap between the pole pieces. The tank 12 is air-tight and conventional vacuum pumps (not shown) communicate with the tank for the evacuation thereof.

In accordance with the principles of a frequency modulated cyclotron, charged particles which are introduced into the tank 12 centrally of the magnetic field between the pole pieces 16, 17 may be accelerated to high energies by a suitable radio-frequency electric field established transversely of the magnetic field. To establish such an electric field, there is provided a radio-frequency transmission line comprising, in part, a rectangular hollow conductor 21 supported within the tank 12 on suitable insulators (not shown) and extended to substantially enclose the accelerated particles during one-half of each revolution. At the innermost end 22 the hollow conductor 21 is open to form a slot 23 through which particles may travel during acceleration and at the other end 24 there is provided a section of reduced thickness extending into the enlarged portion 18 of the tank 12.

As a continuation of the transmission line and to provide frequency modulation of the voltage, there are provided oppositely disposed flexible blades 26 having base portions 27 and elongated tapering portions 28. The blades 26 are mounted so that the tapering portions 28 may be vibrated with respect to the end 24, having a reduced thickness, of the hollow conductor 21. Two parallel spacer members 31 are disposed between the base portions 27 of the blades 26 and maintained in proper position by flexible frame members 32 suitably affixed thereto. Clamp plates 33 are disposed adjacent to the base portions 27 of the blades 26 and suitably secured by a plurality of nut and bolt combinations 34 extending through such clamp plates and the blades 26. It is to be noted that the foregoing elements provide a dynamic coupling unit between the opposing blades 26 which, while substantially rigid in construction to suitably support the blades, is sufficiently flexible that vibrations of one blade are transferred to the base 27 of the other blade in proper phase to insure equal amplitude of vibration with a 180 degree phase relationship at the tapering portion 28 of such other blade. The coupling unit between the blades 26 may be suitably positioned in the enlarged portion 18 of the tank 12 by a support element 36, which is sufficiently flexible to permit the above-mentioned inter-blade coupling to occur, secured in a suitable manner between a movable panel 37 of the tank and the outermost spacer 31 of the coupling.

The dimensions of the blades 26 and the characteristics of the magnetic material thereof are selected to have a natural frequency equal to the modulation frequency of the radio-frequency system. Also, the material is selected to have a high value of endurance limit stress and cross-sectional dimensions to minimize the actual stress, thus permitting maximum amplitude of vibration and hence maximum frequency change. While a single set of blades 26 may be used, it has been found that, where the required width is large, a plurality of sets of blades 26 disposed in side-by-side relation is preferable because of greater ease of machining to the desired accuracy.

To effect a controlled vibration of the blades 26, an electromagnet 41 is disposed symmetrically between the opposing blades of each set by a nonresonant support arm 42 suitably attached at one end to the electromagnet and rigidly mounted at the other end to the innermost spacer 31 of the coupling. Such electromagnet 41 is enclosed within a housing 43 of nonmagnetic material and comprises a core 44 having a substantially H-shaped cross section with an alternating current winding 46 suitably wound about the core to provide poles adjacent to the blades 26.

For convenience, in the present embodiment of the invention, the tank 12 serves as the second line of the radio-frequency transmission line system and conducting sheets 47 are connected between the clamp plates 33 and the movable panel 37 of the tank to provide continuity of the system and a short-circuited termination. Suitable radio-frequency excitation of the transmission line system results in a standing wave voltage distribution to be discussed more fully hereinafter. Since the tank 12 is utilized as the return line of the system, two similar plates 48 and 49 are mounted in alignment on opposing walls of the tank 12 and extended transversely thereof to provide a slot 51 therebetween which is similar to and parallel to the slot 23 at the innermost end 22 of the hollow conductor 21. Preferably the distance between the two slots 23 and 51 is established so that sparking will not occur between the elements forming such slots at the impressed voltage differences and so that the center line of the gap thus provided is substantially parallel to a diameter of the pole pieces 16, 17. It will be noted from the foregoing that upon proper radio-frequency excitation of the transmission line system an electric field is established transverse to the magnetic field between the pole pieces 16, 17 and along the path of particles introduced within such magnetic field.

An oscillator housing 56 is mounted upon the enlarged portion 18 of the tank 12 with a power conductor 59 extending into the tank 12 and connecting to the tank 12 as a coupling loop. A feedback conductor 58, also connected to the tank 12, is extended into the oscillator housing 56 as a pick-up loop. The oscillator circuit (not shown) is conventional, connected to the conductors 58, 59, and employs the inductance and capacitance of the transmission line system as a tank circuit to determine the frequency of oscillation in a manner well known in the art.

A source (not shown) of alternating current to energize the electromagnets 41 is provided external to the tank 12. Devices (not shown) for altering the voltage impressed upon individual electromagnets 41, such as variable autotransformers, may be readily connected across the source of alternating current with conductors 60 extending into the tank 12 for connection to the winding 46 of the electromagnets so that the amplitude of vibration of the blades 26 may be easily controlled. Since the force between the electromagnets 41 and the blades 26 is always one of attraction, it is necessary that the frequency of the alternating current be one-half of the modulation frequency.

From the foregoing it is seen that the blades 26 provide modulation of the frequency over a range which is determined by the amplitude of vibration with the median value of the frequency determined by the characteristic impedance and length of the transmission line system. To alter the characteristic impedance of the system, movable panels 61 are provided parallel to each side of the blades 26 and coextensive therewith. Movement of the panels 61 may be accomplished in any conventional manner, as by mechanically controlled arms 62 extending through the walls of the enlarged portion 18 of the tank 12. Electrical continuity is provided by flexible conductors 63 connected from either end of the panels 61 to the adjacent walls of the tank 12. In such manner it will be apparent that modulation of the frequency may be accomplished over different ranges of frequency without altering the amplitude of vibration of the blades 26. The foregoing may also be achieved by the addition of a series capacitance (not shown), as by mounting a capacitor arrangement comprising conducting plates upon the end 24 of the hollow conductor 21 extending between the blades 26. A combination of the two methods of altering the characteristic impedance may be necessary to attain a desired range of values of frequency above that possible with each applied separately.

As has been previously indicated the coupling unit between opposing blades 26 provides constant phase and amplitude relationship during vibration of the blades, but where a plurality of sets of blades is utilized it becomes necessary to maintain the phase and amplitude relation between sets by other means. The simplest effective means of phase control between the pairs of blades 26 depends upon variation of the modulus of elasticity of the blade material with temperature. Accordingly, each of the blades 26 is provided with communicating passages 66 through which temperature controlled water may be pumped by conventional means (not shown). Such temperature variation also produces thermal expansion which acts in a direction to augment the change in elastic modulus. For properly controlling the temperature of the blades 26, and thereby the phase relationship between sets, conventional apparatus may be adapted to sense blade position as a function of time and hence indicate the relative phase thereof. The temperature control of the blades 26 provides variation of the natural frequency of vibration, and consequently of the phase of the blade with respect to the magnet current. The principal control of the amplitude of vibration of the blades 26, after proper phasing is accomplished by adjustment of the excitation of the electromagnets 41 to achieve the desired range.

For a predetermined value of voltage at the innermost end 22 of the rectangular conductor 21, predetermined dimensions of such conductor and tank 12, and an assumed permissible ratio of capacitor voltage to D voltage, the distances determining the medial point of overlap between the blades 26 and rectangular conductor may be readily calculated. Having made such determination the voltage distribution along the transmission line system will be a standing wave and may be readily calculated (see Fig. 3 for a plot of such voltage distribution). It will be noted that for several different frequencies ($f_1$, $f_2$, $f_3$, and $f_4$ of Fig. 3) the voltage is zero at the short-circuited end and equal to the predetermined value at the innermost end 22 of the rectangular conductor 21 with intermediate values varying for the different frequencies.

Consider now the operation of the invention with the oscillator in the housing 56 suitably energized to excite the radio-frequency transmission line system. Next, the electromagnets 41 are excited to provide vibration of the blades 26 at the desired modulation rate. With such an arrangement the opposing blades 26 are each forced to vibrate toward and then away from the end 23 of the rectangular conductor 21. The amplitude of vibration of the blades 26 then determines the maximum and minimum values of capacitance between the blades and the rectangular conductor 21. Thus, the series capacitance of the system is altered cyclically to alter the frequency of the system in a similar manner.

As an example of the foregoing radio-frequency system for use with a 184 inch frequency modulated cyclotron having a maximum magnetic field value of 23 kilogauss, the following details are set forth. Each of the blades 26 has an overall length of 38 inches with 32 inches thereof tapered from approximately 1¼ inches to $\frac{1}{16}$ inch and has a width of 45 inches. Four pairs of such blades 26 are utilized in side-by-side relation with separate electromagnets 41 for each pair. The blades 26 are machined to have a natural frequency of 60±0.1 cycles per second and the frequency of the alternating current excitation for the electromagnets 41 is 30 cycles per second. The natural frequency of the blades 26 is selected to be equal to the desired 60 cycles per second modulation frequency of the cyclotron. The blades 26 are machined from an alloy of steel with a nitriding process applied to increase the value of the endurance limit stress and with a copper plating applied for increased electrical conductivity. With such elements it is possible to attain a frequency range of 35.2 to 18.7 megacycles per second for acceleration of protons and 17.6 to 13.4 megacycles per second for acceleration of deuterons while the frequency range for acceleration of alpha particles and $He^3$ ions with two charges fall within the frequency ranges set out for protons and deuterons.

While the salient features of the present invention have been described in detail with respect to one embodiment, it will be apparent that numerous modifications may be made within the spirit and scope of the invention, and it is therefore not desired to limit the invention to the exact details shown except insofar as defined in the following claims.

What is claimed is:

1. In a radio-frequency system for a cyclotron having an electromagnet with a pair of opposing pole pieces, the combination comprising a vacuum tank partially disposed between said pole pieces, a hollow rectangular conductor disposed within said tank in insulated relation, a pair of similar flexible blades mounted oppositely within said tank to vibrate as a variable capacitor with respect to a terminal section of said conductor, said blades being electrically connected together and to said tank, means disposed between said blades to provide vibration thereof at a modulation frequency, and radio-frequency energizing means coupled between said tank and said blades.

2. In a radio-frequency system for a cyclotron having an electromagnet with a pair of opposing pole pieces, the combination comprising a vacuum tank partially disposed between said pole pieces, a hollow rectangular conductor disposed within said tank in insulated relation, a pair of oppositely disposed flexible blades having a base portion and a tapered portion mounted with the tapered portions in overlapping relation with respect to a terminal section of said conductor, a flexible coupling unit mounted between the bases of said blades to establish an equal amplitude and 180 degree phase difference of vibration between the tapered portion of said blades, said blades being electrically connected at the base and to said tank, means disposed between said blades to provide vibration thereof at a modulation frequency, and a radio-frequency oscillator coupled between said tank and blades to provide excitation.

3. The combination of claim 2 wherein said flexible coupling unit is further characterized as having a pair of parallel spacer elements disposed transversely between the base of said blades, flexible frame members mounted between said spacer elements, a pair of clamp plates respectively disposed at the base of said blades, a plurality of bolts extended through said clamp plates and blades with engaging nuts and a flexible support element secured between one of said spacer elements and said tank, whereby dynamic coupling is provided to transfer vibrations between blades to establish equal amplitude and a 180 degree phase relationship of vibration between the tapered portion of said blades.

4. In a radio-frequency system for a cyclotron having an electromagnet with a pair of opposing pole pieces, the combination comprising a vacuum tank having a first portion disposed between said pole pieces and a second portion, a hollow rectangular conductor disposed within the first portion of said tank in insulated relation, a pair of flexible blades mounted within the second portion of said tank to vibrate with respect to opposite sides of a terminal section of said conductor, said blades being electrically connected together and to said tank, movable panels disposed parallel to and coextensive with said blades, said panels being electrically connected at each end to said tank to provide electrical continuity, means disposed between said blades to provide vibration thereof at a modulation frequency, and a radio-frequency oscillator coupled between said panels and blades to provide excitation.

5. In a radio-frequency system for a cyclotron having an electromagnet with a pair of opposing pole pieces, the combination comprising a vacuum tank having a first portion disposed between said pole pieces and a second portion, a hollow rectangular conductor disposed within the first portion of said tank in insulated relation, a pair of flexible blades mounted within the second portion of said tank to vibrate with respect to opposite sides of a terminal section of said conductor, said blades being electrically connected together and to said tank, movable panels disposed parallel to and coextensive with said blades, said panels being electrically connected at each end to said tank to provide electrical continuity, an electromagnet wound on a magnetic core disposed between said blades to provide a vibrating force, a variable alternating current having a frequency equal to one-half of a desired modulation frequency connected to said electromagnet between said blades, and a radio-frequency oscillator coupled between said panels and blades to provide excitation.

6. In a radio-frequency system for a cyclotron having an electromagnet with a pair of opposing pole pieces, the combination comprising a vacuum tank having a first portion disposed between said pole pieces and a second portion, a hollow rectangular conductor disposed within the first portion of said tank in insulated relation, a plurality of pairs of oppositely mounted flexible blades disposed in the second portion of said tank to vibrate with respect to a terminal section of said conductor, each of said blades having a base portion and an elongated tapered portion with the bases of each pair connected together and to said tank, a plurality of separately controlled electromagnets respectively disposed between the blades of each pair to provide vibration thereof at a modulation frequency, and a radio-frequency oscillator coupled between said tank and blades to provide excitation.

7. The combination of claim 6 wherein said blades are further characterized as having communicating passages for the flow of temperature controlled water to provide individual control of the natural frequency of said blade.

References Cited in the file of this patent

UNITED STATES PATENTS 2,545,623   MacKenzie _____ Mar. 20, 1951